United States Patent [19]

Mager

[11] Patent Number: 5,789,913

[45] Date of Patent: Aug. 4, 1998

[54] METHOD FOR ANALYZING AND EQUALIZING SIGNALS

[75] Inventor: Klaus Mager, Bad Dürrheim, Germany

[73] Assignee: Deutsche Thomson Brandt GmbH, Germany

[21] Appl. No.: 966,572

[22] Filed: Nov. 10, 1997

Related U.S. Application Data

[63] Continuation of Ser. No. 423,669, Apr. 19, 1995, abandoned.

[30] Foreign Application Priority Data

Apr. 30, 1994 [DE] Germany ............... 44 15 208.6

[51] Int. Cl.⁶ ............... H03H 13/28; H03H 7/01; G01R 31/00; G01R 13/28
[52] U.S. Cl. ............... 324/76.79; 324/76.38; 360/65; 375/230
[58] Field of Search ............... 324/76.12, 76.41, 324/76.42, 76.79, 76.82, 76.38; 360/65; 375/229, 230, 232

[56] References Cited

U.S. PATENT DOCUMENTS

| | | | |
|---|---|---|---|
| 3,534,399 | 10/1970 | Hirsch | 324/76.83 |
| 3,864,638 | 2/1975 | Audenard et al. | 327/7 |
| 3,868,576 | 2/1975 | Bagdasarjanz et al. | 325/65 |
| 4,041,254 | 8/1977 | Bradley et al. | 324/121 R |
| 4,184,827 | 1/1980 | Von Herrmann et al. | 324/121 R |
| 4,362,973 | 12/1982 | Brentlinger | 315/393 |
| 4,381,546 | 4/1983 | Armstrong | 364/514 |
| 5,128,609 | 7/1992 | Howley | 324/121 R |

FOREIGN PATENT DOCUMENTS

| | | |
|---|---|---|
| 2 056 679 | 5/1993 | Canada . |
| 01195324 | 11/1989 | Japan . |
| 05 007312 | 1/1993 | Japan . |
| 5-73 12A | 5/1993 | Japan . |

OTHER PUBLICATIONS

IBM technical disclosure, IBM corp. NN70111499 IBM technical disclosure Bulletin, Nov. 1970.
IBM Technical Disclosure Bulletin, vol. 13, No. 6, Nov. 1970, Hoffmann C.R., Eye Opening Detector S.1499–1500; 3–10.

*Primary Examiner*—Walter E. Snow
*Attorney, Agent, or Firm*—Joseph S. Tripoli; Frederick A. Wein; Francis A. Davenport

[57] ABSTRACT

Equalizers, used for equalizing distorted signals, are calibrated with the aid of the so-called "eye" pattern on the oscilloscope. Data bits are traced with their edges above one another by triggering to the amplitude so that an "eye" opening is produced. The "eye" is wide open and sharply delimited in the case of correct equalization. However, this method does not provide for automatic calibration of the equalizer. In order to automatically calibrate an equalizer in an optimal manner, a Lissajous figure is formed from in each case of two successive samples of the signal to be equalized. A fuzzy logic control loop compares the Lissajous figures generated with a circle in the case of a sine oscillation and with a square in the case of a square wave oscillation. From this comparison, the fuzzy logic control loop derives the parameters for the equalizer. The equalizer is optimally calibrated when a circle or, respectively, a square is formed as Lissajous figure.

13 Claims, 5 Drawing Sheets

EYE PATTERN, VARIATION WITH TIME AND LISSAJOUS
FIGURE OF A POORLY EQUALIZED SIGNAL

VARIATION WITH TIME OF THE SIGNAL AND OF THE
CUT-OFF FREQUENCIES DURING ADAPTION

EYE PATTERN, VARIATION WITH TIME AND LISSAJOUS
FIGURE OF THE SIGNAL AFTER ADAPTION WITH FUZZY LOGIC

METHOD FOR ANALYZING AND EQUALIZING SIGNALS

This application is continuation 08/423,669 filed Apr. 19, 1995 abandoned.

BACKGROUND

The present invention relates to a method and apparatus for analyzing and equalizing signals.

As a rule, the replay signals of a video recorder or of a CD player are distorted. So-called equalizers are provided for equalization of such distorted signals. The equalization is optimized by optimally setting the parameters of the equalizer.

It is known to display the equalized replay signal as an "eye" pattern on the oscilloscope for calibrating an equalizer. In forming the "eye" pattern, the data bits are traced with their edges on top of one another by triggering the oscilloscope to the amplitude, so that an opening, the so-called "eye", is produced. When the equalization of the data signal is correct, the "eye" is wide open and sharply delimited. With inadequate amplitude equalization, the "eye" closes in the vertical direction and with a lack of phase equalization it closes in the horizontal direction. The phase is calibrated in accordance with the trial-and-error method.

However, the "eye" diagram cannot be used for signal processing for the adaptive calibration of the parameters of the equalizer because the data includes random sequences with an unknown edge time.

It is therefore an object of the present invention to provide an automatic method and apparatus for calibrating an equalizer which provides information on the quality of the equalization.

This object is achieved by the present invention in that the signal to be analyzed and equalized is sampled with samples being generated, and that in each case two successive samples are used to generate a Lissajous figure in a Lissajous plane.

A Lissajous figure is formed when the amplitudes of two phase-shifted oscillations are plotted in a coordinate system. If, for example, a sinusoidal oscillation is plotted along the X axis and a cosine oscillation is plotted along the Y axis, a circle is produced if both oscillations have the same frequency. The determining factor for the circular figure is that the phase shift between a sine and a cosine oscillation is 90°.

According to the present invention, however, it is not two different oscillations which are supplied to a Lissajous generator for generating Lissajous figures. Instead, the generator is supplied with the current sample, and in each case, the following sample of the signal for generating Lissajous figures.

An aspect of the present invention is the recognition that the samples are actually 90° apart with respect to the maximum signal frequency in the case of a completely equalized data signal. For this reason, a circle is formed as Lissajous figure if the sampled data signal is a sinusoidal oscillation.

Another aspect of the present invention is the recognition that if the sampled data signal is a square wave oscillation, a square is formed as Lissajous figure. If, however, the data signal is distorted, as is usual in practice, more or less different ellipses are displayed as Lissajous figures instead of a circle or, respectively, a square.

Still another aspect of the invention is the recognition that by changing the parameters of the equalizer, the equalization, and thus also the figure of the Lissajous figure generated, is changed. Thus, according to aspects of the present invention, the parameters of the equalizer are changed in such a manner that a circle is formed as a Lissajous figure in the case of a sinusoidal oscillation and a square is formed as a Lissajous figure in the case of a square wave oscillation.

The equalizer can be calibrated automatically, in accordance with the present invention, by use of a fuzzy logic control loop.

DETAILED DESCRIPTION OF THE PREFERRED EMBODIMENT

Figure 1:
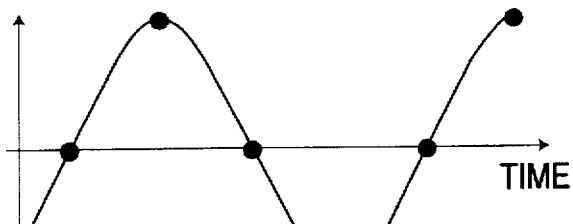
FIG. 1 shows a sinusoidal oscillation and a circle as the associated Lissajous figure.
Figure 1:
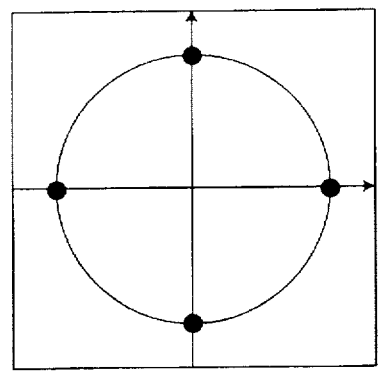
Figure 2:
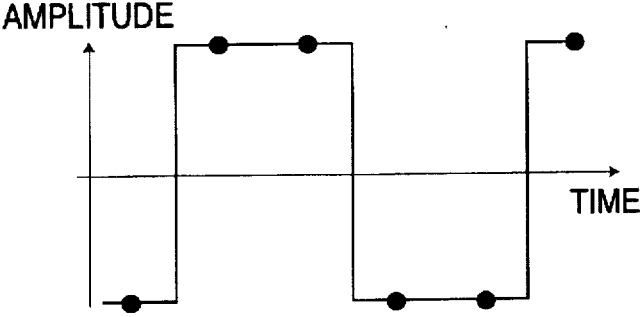
FIG. 2 shows a square wave oscillation and a square as the associated Lissajous figure.
Figure 2:
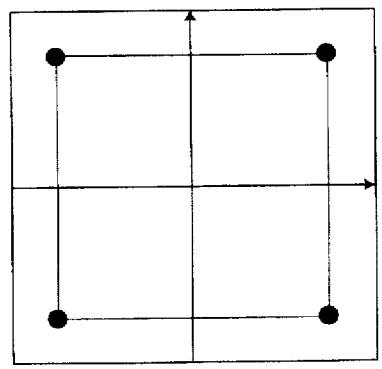
Figure 3:
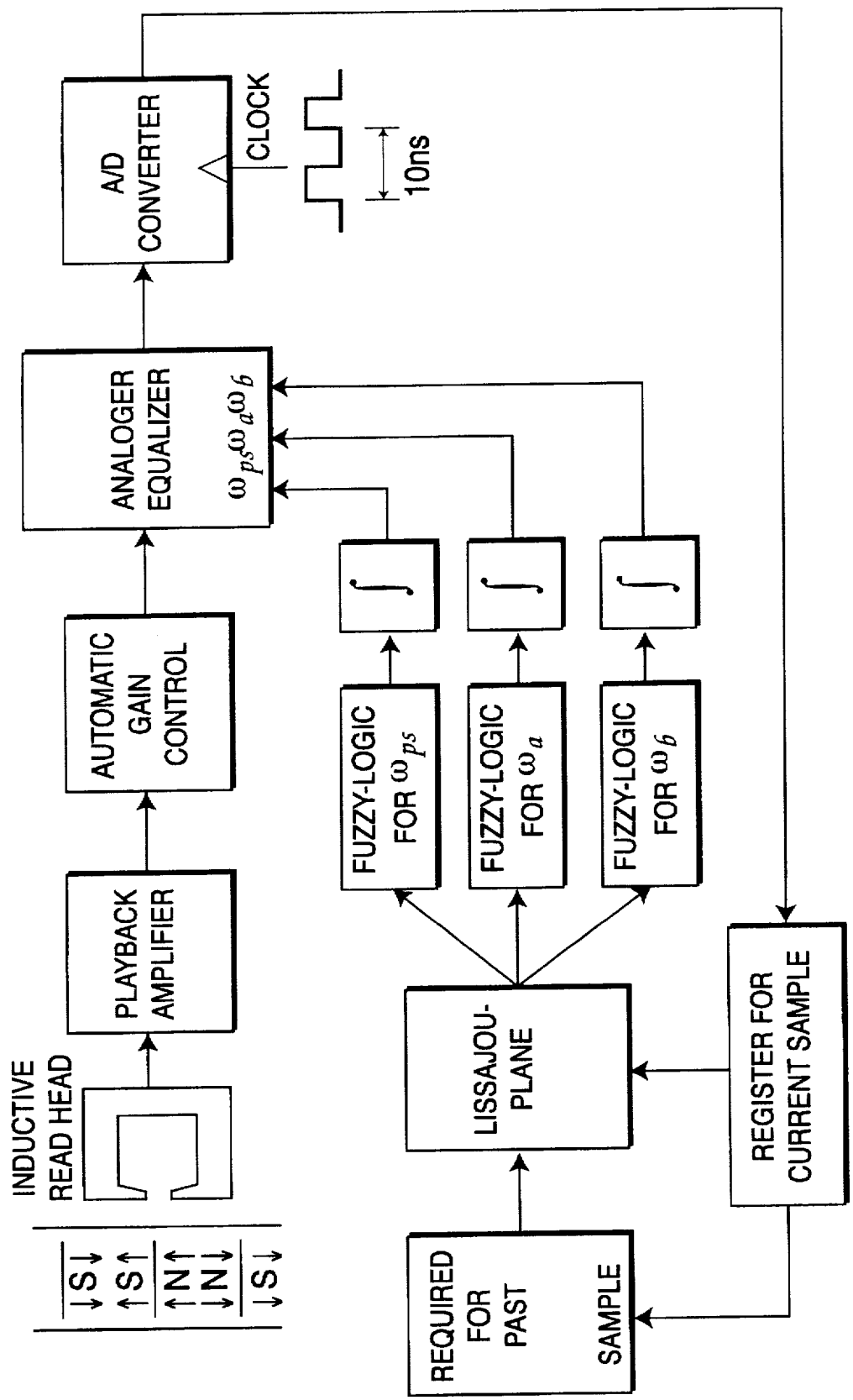
FIG. 3 shows an illustrative embodiment of the invention.
Figure 4:
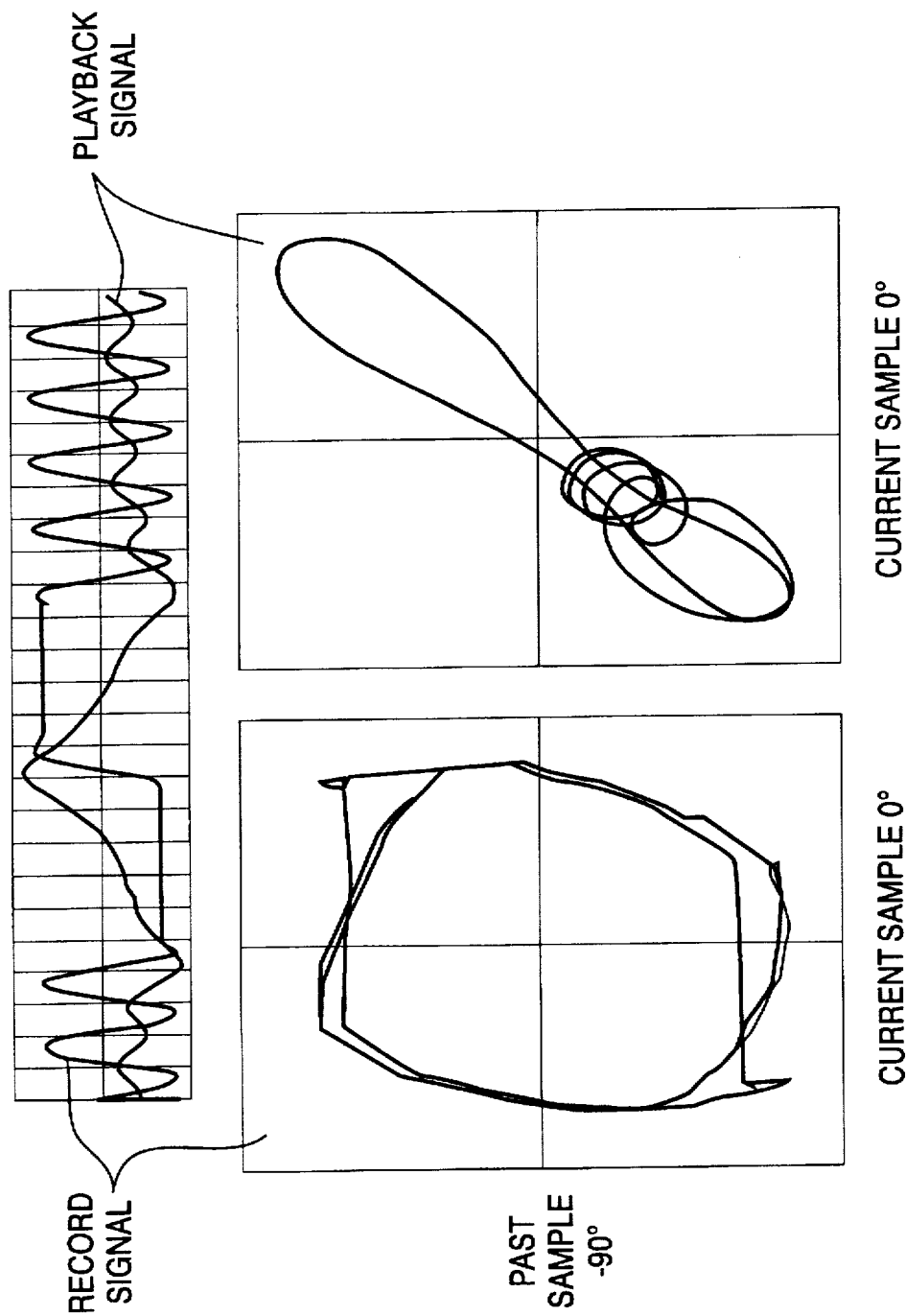
FIG. 4 shows a distorted data signal and the associated Lissajous figures.
Figure 5:
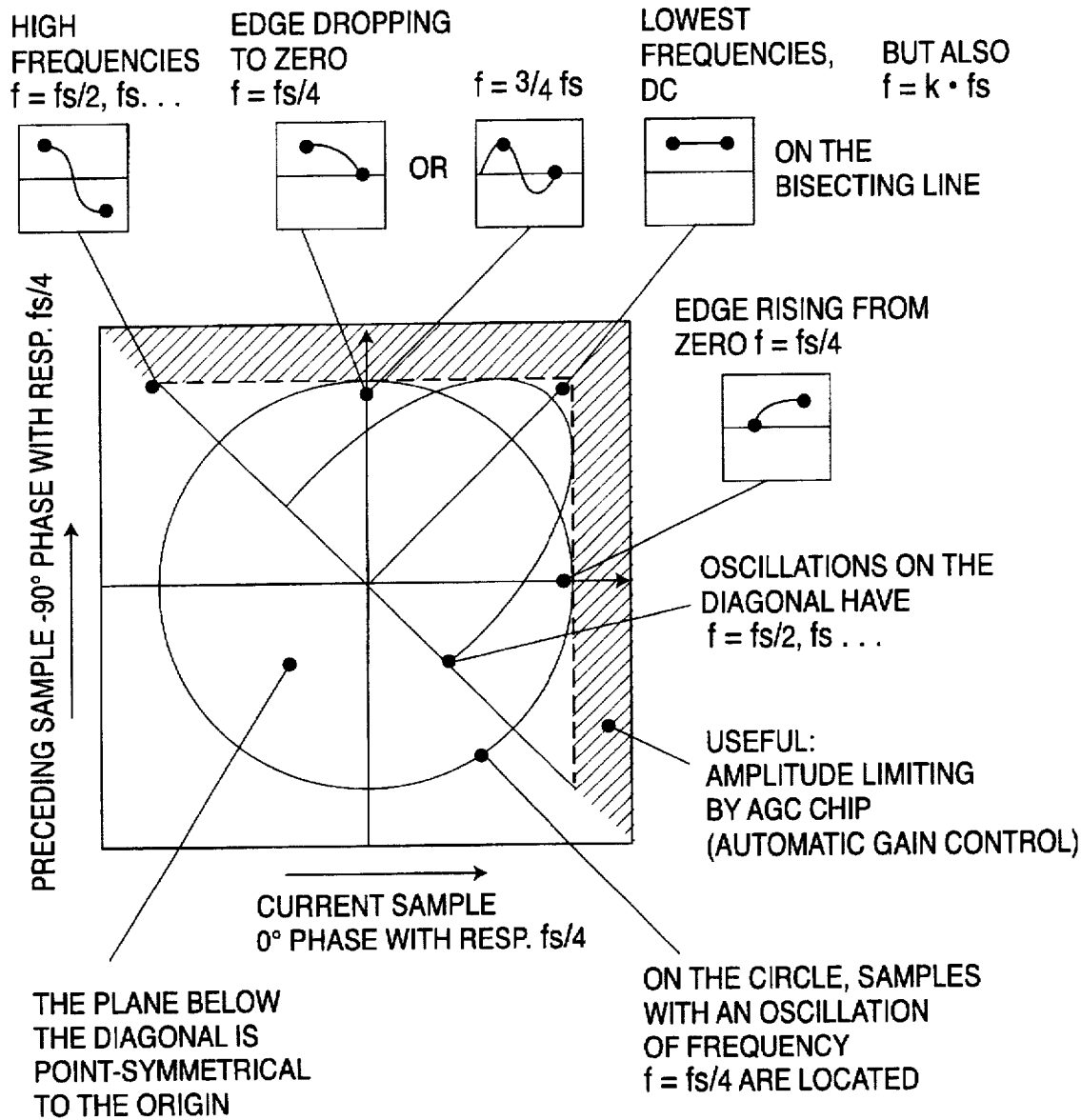
FIG. 5 shows the allocation of regions in the Lissajous plane in accordance with frequency ranges.
Figure 6:
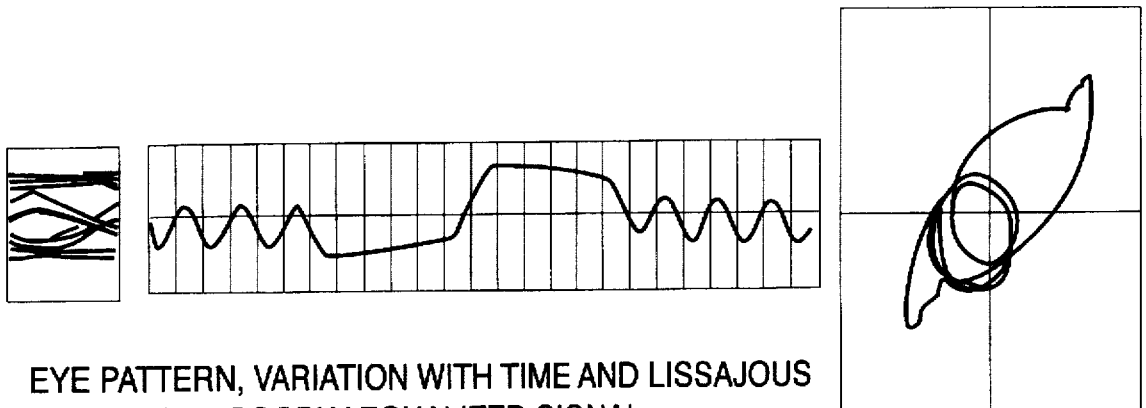
FIG. 6 shows an "eye" pattern, the variation with time, and the Lissajous figure of an inadequately equalized signal.
Figure 6:
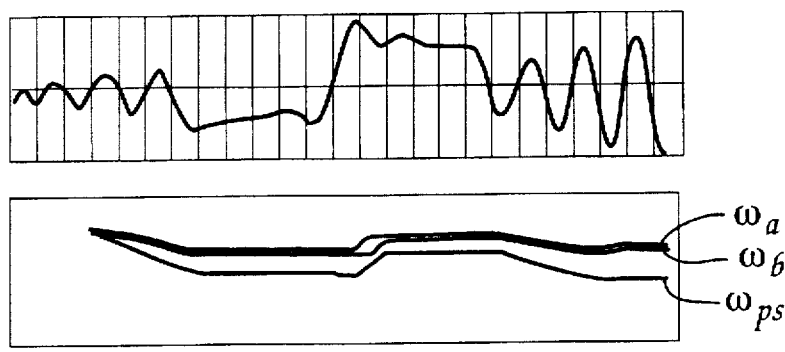
Figure 7:
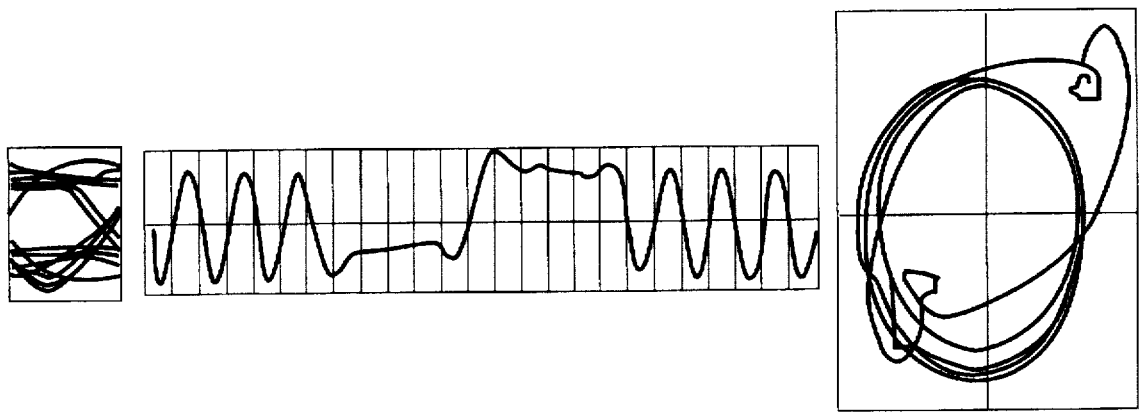
FIG. 7 shows an "eye" pattern, the variation with time, and the Lissajous figure of a signal equalized according to aspects of the present invention.

The invention will now be discussed with reference to the illustrative embodiment shown in FIG. 4. The data recorded on a magnetic carrier, for example a magnetic tape MB, are read by a read head LK. The output signal supplied by the read head LK is amplified in an amplifier V and then equalized in an equalizer E. The equalized output signal of the equalizer E is supplied via an analog/digital converter ADC to a first register R1, the output signal of which is supplied both to a second register R2 and to a generator LF for generating Lissajous figures. The output of the generator LF for generating Lissajous figures is connected to the input of a first, a second and a third fuzzy logic controller F1, F2 and F3. The outputs of the three fuzzy logic controllers are connected via one integrator 1 each to the parameter inputs of the equalizer E.

The ADC generates the samples of the data signal. The current sample in each case is stored in the first register R1, the preceding sample is stored in the second register R2. The generator LF for generating Lissajous figures therefore generates a Lissajous figure from, in each case, two successive samples. The three fuzzy logic controllers F1, F2 and F3 then compare the Lissajous figures generated by the generator LF with a circle or, respectively, with a square. The deviations from these ideal figures found by the fuzzy logic controllers F1, F2 and F3 are used for changing the parameters of the equalizer.

The following control strategy is provided for the fuzzy logic controllers F1, F2 and F3.

When the samples fall more or less in the center of the Lissajous plane, the cut-off frequencies of the equalizer are corrected downward. When the samples touch the outer corner points, the first cut-off frequency $\omega_{ps}$ of the equalizer is increased.

When the edges rising from zero are not steep enough, the second cut-off frequency $\omega_a$ of the equalizer is lowered;

when the samples fall on the edge of the region, in contrast, the second cut-off frequency $\omega_a$ is increased.

If the edges dropping to zero fall off at too shallow an angle, the third cut-off frequency $\omega_b$ is lowered whereas the third cut-off frequency $\omega_b$ is increased when the samples fall on the edge of the region.

If the samples are on a circle in the case of a sinusoidal oscillation or, respectively, on a square in the case of a square wave oscillation, the cut-off frequencies of the equalizer are not changed.

If the amplitude drops while the binary value remains the same, the cut-off frequencies are also not changed.

The first cut-off frequency $\omega_{ps}$ is the so-called pulse-slimmer frequency. The method according to the invention for equalizing a distorted data signal provides the advantage that an observer can view the Lissajous figures on an oscilloscope. By changing the parameters of the equalizer, the observer can see on the oscilloscope how well the distorted data signal is equalized.

A further advantage of the invention is based on the fact that the equalization can be carried out automatically by analyzing the Lissajous figures by means of the fuzzy logic control loop.

I claim:

1. A circuit arrangement for analyzing and equalizing a signal comprising:
    an equalizer having an input terminal for receiving the signal, and providing an equalizer output signal;
    a DAC for receiving the equalizer output signal and having a DAC output signal;
    a first register for receiving the DAC output signal for a current sample and providing a first register output signal;
    a generator having a first input for receiving the first register output signal for generating Lissajous figures, and
    a second register for storing the preceding sample and having a second register output terminal coupled to a second input of the generator for generating Lissajous figures, the generator having a plurality of output signals coupled to respective inputs of a plurality of fuzzy logic controllers, an output signal of the fuzzy logic controllers being coupled via an integrator to parameter inputs of the equalizer.

2. A method for analyzing and equalizing a signal comprising the steps of:
    coupling a signal to be equalized to an equalizer;
    coupling an output signal of the equalizer to a first register via a DAC;
    coupling an output signal of the first register to a first input terminal of a generator for generating Lissajous figures, and to an input of a second register,
    coupling an output signal of the second register to a second input of the generator for generating Lissajous figures,
    coupling output signals of the generator for generating Lissajous figures to respective input terminals of a plurality of fuzzy logic controllers, and
    coupling output signals of the controllers to the equalizer for setting the parameters of the equalizer.

3. The method according to claim 2, wherein cut-off frequencies of the equalizer are adjusted downward in frequency when the samples fall approximately in a center of the Lissajous plane.

4. The method according to claim 2, wherein a first cut-off frequency $\omega_{ps}$ is increased when corner points of the Lissajous figure are touched.

5. The method according to claim 2, wherein a second cut-off frequency $\omega_a$ is lowered when edges of the Lissajous figure rising from zero are not steep, and the second cut-off frequency $\omega_a$ is increased when samples fall at edge regions.

6. The method according to claim 2, wherein a third cut-off frequency $\omega_b$ is lowered when the edges falling to zero do not fall at a sufficiently shallow angle, in that the third cut-off frequency $\omega_b$ is increased when the samples fall on an edge of the region.

7. The method according to claim 2, wherein cut-off frequencies are not changed when the samples are on a circle or a square.

8. Apparatus for analyzing and equalizing a signal comprising:
    means for coupling the signal to be equalized to an equalizer, the equalizer having an output signal;
    means for coupling the output signal of the equalizer to a first register via a DAC, the first register having an output signal;
    means for coupling the output signal of the first register to a first input of a generator for generating Lissajous figures, and to an input of a second register;
    means for coupling the output signal of the first register to an input terminal of a second register, the second register having an output signal;
    means for coupling the output signal of the second register to a second input of the generator for generating Lissajous figures, and
    means for coupling an output signals of the generator for generating Lissajous figures to input terminals of a plurality of fuzzy logic controllers, an output signals of the controllers being coupled to the equalizer for setting the parameters of the equalizer.

9. The apparatus according to claim 8, wherein cut-off frequencies of the equalizer are adjusted downward in frequency when the samples fall approximately in a center of the Lissajous plane.

10. The apparatus according to claim 8, wherein a first cutoff frequency $\omega_{ps}$ is increased when corner points of the Lissajous figure are touched.

11. The apparatus according to claim 8, wherein a second cut-off frequency $\omega_a$ is lowered when the edges of the Lissajous figure rising from zero are not steep, and the second cut-off frequency $\omega_a$ is increased when the samples fall in an edge regions.

12. The apparatus according to claim 8, wherein a third cut-off frequency $\omega_b$ is lowered when edges falling to zero do not fall at a sufficiently shallow angle, and a third cut-off frequency $\omega_b$ is increased when the samples fall on an edge of the region.

13. The apparatus according to claim 8, wherein cut-off frequencies are not changed when the samples are on a circle or a square.

* * * * *